Aug. 19, 1941.   C. OMAN   2,253,392
SYNCHROSCOPE
Filed Jan. 10, 1940
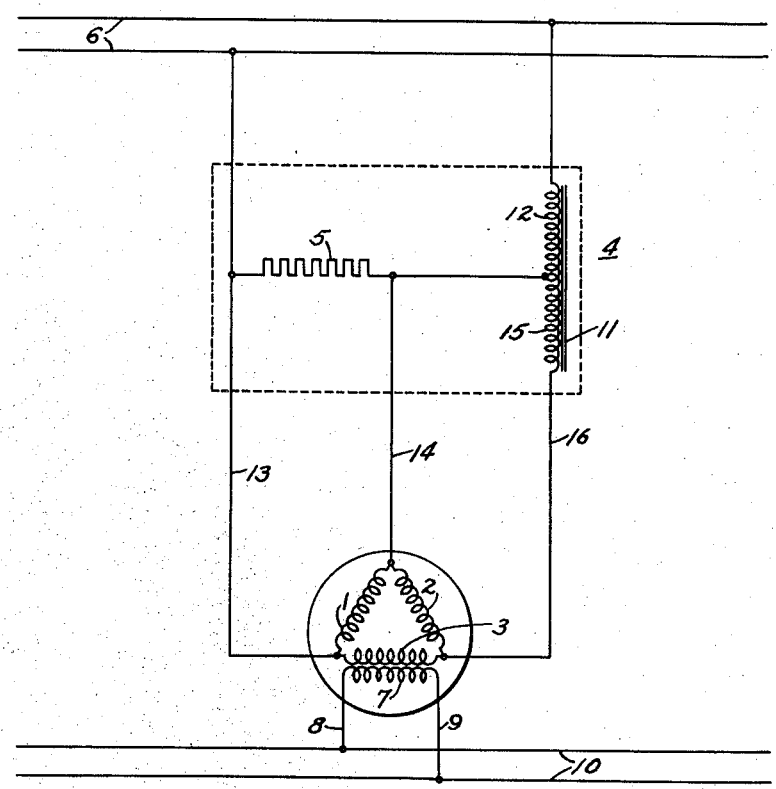
WITNESSES:
Leon M. Garman
David Kreider
INVENTOR
Carl Oman.
BY
ATTORNEY Patented Aug. 19, 1941

2,253,392

UNITED STATES PATENT OFFICE 2,253,392

SYNCHROSCOPE

Carl Oman, Cedar Grove, N. J., assignor to Westinghouse Electric & Manufacturing Company, East Pittsburgh, Pa., a corporation of Pennsylvania Application January 10, 1940, Serial No. 313,302

6 Claims. (Cl. 172—238)

My invention relates to a means for obtaining a three-phase voltage from a single-phase voltage supply and more particularly to such a means for use in providing a three-phase field in a synchronizing device.

It is an object of my invention to provide a novel and economical circuit for producing a balanced three-phase voltage from a single-phase alternating current supply.

It is another object of my invention to provide a synchroscope with a three-phase winding energized from a single-phase circuit by means of my novel arrangement.

Heretofore it has been most common in synchronism indicators or synchroscopes to provide a two-phase rotating field from one winding of the instrument and use this field in cooperation with the single-phase winding to indicate the relationship between the circuits to be synchronized. It has, however, been found easier to obtain a well distributed field with a three-phase winding than with the usual two-phase type and my invention provides an improved means for obtaining such a three-phase field from a single-phase source.

In the drawing the single figure is a diagrammatic view of a synchroscope embodying my invention.

The drawing shows three-phase coils 1, 2 and 3 of a synchroscope arranged in delta and connected through a circuit comprising an auto-transformer 4 and a resistance 5 to the lines 6 which are energized from the running machine. The single-phase coil 7 is connected through the leads 8 and 9 to the line 10 which is energized from the incoming machine.

The transformer 4 includes a magnetic core 11 and has its primary winding 12 connected in series with the resistance 5 across the line 6. The coil 1 is connected across the resistance 5 by conductors 13 and 14. Coil 2 is energized from the secondary winding 15 of the auto-transformer through conductors 14 and 16 while coil 3 is connected across the series circuit comprising the resistance 5 and the transformer secondary 15 by means of conductors 13 and 16.

The transformer 4 is designed with a very high leakage between its primary winding 12 and secondary winding 15. This will cause the angle between the primary and secondary voltages to be less than 180 degrees. A phase difference of 120 degrees between the voltages across the resistance 5 and the transformer secondary 15 may be obtained resulting in the same phase difference between the currents in the coils 1 and 2.

It will be obvious that the voltage across, and consequently, the current through the winding 3 completes the balanced three-phase system.

It will be understood that my invention is not to be restricted except insofar as is necessitated by the prior art and by the appended claims.

I claim as my invention:

1. In a system for obtaining a three-phase voltage from a single-phase supply, auto-transformer means including primary and secondary windings, impedance means in series circuit with said primary winding, means for energizing said series circuit from said single-phase supply, and terminal means electrically connected to said system for providing a three-phase output therefrom.

2. In a system for obtaining a substantially balanced three-phase voltage from a single-phase voltage supply, an auto-transformer including primary and secondary windings, resistance means connected in series circuit with said primary winding, means for energizing said series circuit from said single-phase supply, and terminal means electrically connected to said system for providing a three-phase output therefrom.

3. In a system for obtaining a substantially balanced three-phase voltage from a single-phase voltage supply, an auto-transformer including primary and secondary windings with high leakage therebetween, resistance means connected in series circuit with said primary winding, means for energizing said series circuit from said single-phase supply, and terminal means electrically connected to said system for providing a three-phase output therefrom.

4. In a system for obtaining a substantially balanced three-phase voltage from a single-phase voltage supply, an auto-transformer including primary and secondary windings with high leakage therebetween, resistance means connected in series circuit with said primary winding, means for energizing said series circuit from said single-phase supply, and three-phase output conducting means electrically connected at each end of said resistance means and at the free end of said secondary winding.

5. In a means for producing a three-phase field in a synchroscope from a single-phase supply, conducting coil means arranged in delta connection, an auto-transformer including primary and secondary windings, resistance means connected in series circuit with said primary winding, means for energizing said series circuit from said single-phase supply, and means for electrically connecting one point of said delta to the free end of said secondary winding and each of the other points thereof to different points along said resistance means.

6. In a means for producing a substantially balanced three-phase field in a synchroscope from a single-phase supply, conducting coil means arranged in delta connection, an autotransformer including primary and secondary windings with high leakage therebetween, resistance means connected in series circuit with said primary winding, means for energizing said series circuit from said single phase supply, and means for electrically connecting one point of said delta to the free end of said secondary winding and each of the other points thereof to a different end of said resistance means.

CARL OMAN.